United States Patent [19]
Suda

[11] Patent Number: 6,008,686
[45] Date of Patent: Dec. 28, 1999

[54] POWER CONSUMPTION CONTROL CIRCUIT FOR CMOS CIRCUIT

[75] Inventor: Masakatsu Suda, Saitama, Japan

[73] Assignee: Advantest Corp., Tokyo, Japan

[21] Appl. No.: 09/098,223

[22] Filed: Jun. 16, 1998

[30] Foreign Application Priority Data

Jun. 24, 1997 [JP] Japan ................................. 9-166749

[51] Int. Cl.6 .................................................. H01L 35/00
[52] U.S. Cl. .......................... 327/513; 327/512; 327/262; 374/183
[58] Field of Search .................................. 327/512, 513, 327/399, 400, 262, 263, 276; 374/183; 324/158.1

[56] References Cited

U.S. PATENT DOCUMENTS

| | | | |
|---|---|---|---|
| 4,980,586 | 12/1990 | Sullivan et al. | 307/591 |
| 5,081,380 | 1/1992 | Chen | 327/262 |
| 5,523,711 | 6/1996 | Tachiyama | 327/513 |
| 5,586,564 | 12/1996 | Sato et al. | 327/513 |
| 5,836,691 | 11/1998 | Yamauchi | 374/117 |

FOREIGN PATENT DOCUMENTS 408330920A  12/1996  Japan .

*Primary Examiner*—Jung Ho Kim
*Attorney, Agent, or Firm*—Muramatsu & Associates

[57] ABSTRACT

A power consumption control circuit for CMOS circuit for achieving a constant signal propagation delay time in the CMOS circuit by maintaining the same power consumption all the time. A leading edge heater and a trailing edge heater are provided in close proximity to the CMOS circuit. During a time period for a leading edge of an input pulse propagates through the CMOS circuit, the leading edge heater is turned off. During a time period for a trailing edge of the input pulse propagates through the CMOS circuit, the trailing edge heater is turned off. As result, an overall current flowing in the CMOS circuit, leading and trailing edge heaters is unchanged regardless of the repetition rate of the input pulse provided to the CMOS circuit.

6 Claims, 10 Drawing Sheets

Fig. 4A
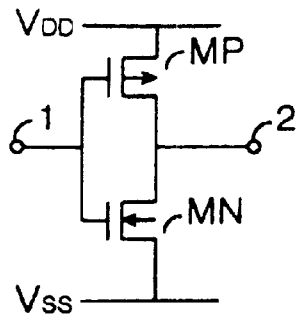
Fig. 4B
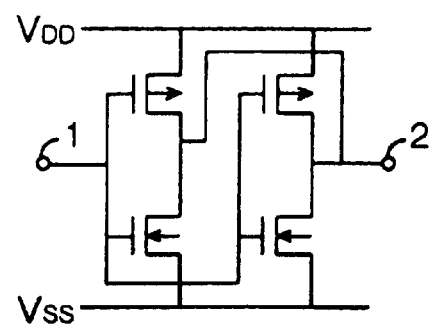
Fig. 5A
Fig. 5B
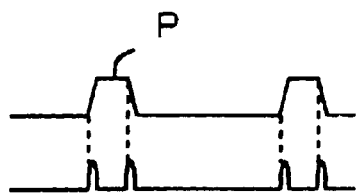
Fig. 6A
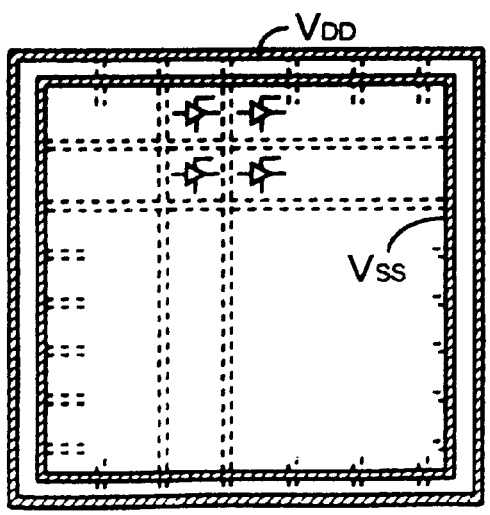
Fig. 6B
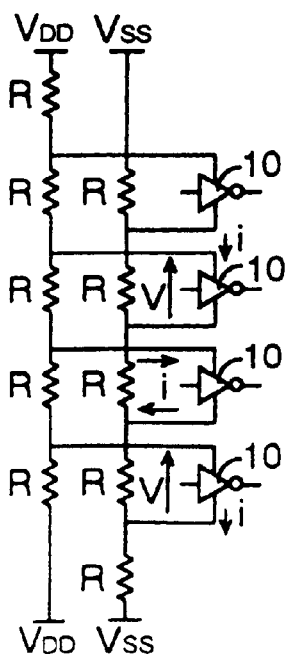

Fig. 14

| VD IN | | VD OUT | | Heater Control | | | | CNT |
|---|---|---|---|---|---|---|---|---|
| IL1 | IL0 | OL1 | OL0 | L1 | L2 | T1 | T2 | |
| 0 | 0 | 0 | 0 | 1 | 1 | 1 | 1 | 0 |
| 0 | 0 | 0 | 1 | 0 | 1 | 0 | 1 | 1 |
| 0 | 0 | 1 | 0 | 0 | 0 | 0 | 0 | 3 |
| 0 | 0 | 1 | 1 | 0 | 0 | 0 | 0 | 2 |
| 0 | 1 | 0 | 0 | 0 | 0 | 0 | 0 | 3 |
| 0 | 1 | 0 | 1 | 1 | 1 | 1 | 1 | 0 |
| 0 | 1 | 1 | 0 | 0 | 0 | 0 | 0 | 2 |
| 0 | 1 | 1 | 1 | 0 | 1 | 0 | 1 | 1 |
| 1 | 0 | 0 | 0 | 0 | 1 | 0 | 1 | 1 |
| 1 | 0 | 0 | 1 | 0 | 0 | 0 | 0 | 2 |
| 1 | 0 | 1 | 0 | 1 | 1 | 1 | 1 | 0 |
| 1 | 0 | 1 | 1 | 0 | 0 | 0 | 0 | 3 |
| 1 | 1 | 0 | 0 | 0 | 0 | 0 | 0 | 2 |
| 1 | 1 | 0 | 1 | 0 | 0 | 0 | 0 | 3 |
| 1 | 1 | 1 | 0 | 0 | 1 | 0 | 1 | 1 |
| 1 | 1 | 1 | 1 | 1 | 1 | 1 | 1 | 0 |

2

POWER CONSUMPTION CONTROL CIRCUIT FOR CMOS CIRCUIT

FIELD OF THE INVENTION

This invention relates to a power consumption control circuit for compensating differences in power consumption in a logic circuit, and more particularly, to a power consumption control circuit for a CMOS circuit to compensate changes in power consumption due to changes in a pulse repetition rate or frequency of an input pulse signal propagating through the CMOS circuit, thereby maintaining constant temperature in the CMOS circuit and a constant signal propagation delay time.

BACKGROUND OF THE INVENTION

It is known that, in a logic circuit such as an IC device circuit using CMOS gates or other types of gates, the amount of heat dissipation will change with the change of the number of pulses applied thereto, i.e., a frequency of an input pulse signal. This is because, in such an IC device circuit, current flows only at the signal transition edges, i.e., rising (leading) and falling (trailing) edges. Thus, the number of pulses or frequency of the input pulse signal is large, the number of occasions for current flowing in the CMOS circuit increases, resulting in the increase in the heat dissipation and the rise of the temperature in the CMOS circuit. The present invention is directed to a power consumption control circuit which regulates the CMOS logic circuit in such a way to maintain the amount of overall current (power consumption or heat dissipation) constant even though the number of pulses propagating through the CMOS logic circuit vary.

More detailed description regarding the heat dissipation by a CMOS circuit is provided in the following with reference to FIGS. 4 and 5. FIG. 4A shows an example of CMOS component such as an inverter circuit formed by CMOS transistors. A transistor MP is a P-channel MOS transistor and a transistor NP is an N-channel MOS transistor, which are connected complimentarily with each other. An input terminal 1 is commonly connected to gates of both of the transistors MP and NP, and an output terminal 2 is provided at a connection point of the transistors MP and NP. An example of FIG. 4B shows two pairs of transistors MP and NP to achieve a larger capacity of output current to increase a fanout (a number of output lines that can be fed by the output terminal).

In FIGS. 4A and 4B, VDD designates a high supply voltage (high voltage H) such as 4 V while VSS designates a low supply voltage (low voltage L) such as 0 V or ground. When the low voltage L is provided to the input terminal 1, the transistor MP is on (conductive) and the transistor NP is off (nonconductive), resulting in an output voltage of high voltage H at the output terminal. Conversely, when the high voltage H is provided to the input terminal 1, the transistor MP is off (nonconductive) and the transistor NP is on (conductive), resulting in an output voltage of low voltage L at the output terminal.

In the CMOS logic circuit such as shown in FIG. 4, in response to signal transition edges, i.e., rising and falling edges of an input pulse signal P of FIG. 5A, both transistors MP and NP become temporarily active. Thus, as shown in FIG. 5B, current flows during these transition periods. The amount of current during this period ranges from several ten micro amperes ($\mu A$) to several milliamperes (mA). The current flow during this period affects a signal propagation delay time in the CMOS circuit as well as the amount of supply voltages. Other than the transition period noted above, only one of the transistors MP and NP is active in which the amount of current flowing in the active transistor is very small.

FIG. 6A shows an example in which a CMOS circuit is affected by such changes in the supply voltages. In this example, a large number of CMOS components such as inverters or buffers are aligned like a manner of matrix on an IC substrate. Main voltage lines are also provided on the substrate to surround the matrix of the CMOS components for providing supply voltages VDD and VSS. A number of fine lines are running from the main voltage lines to the CMOS components. Thus, each of the CMOS components is provided with supply voltages through fine voltage lines connected to the main voltage lines.

FIG. 6B shows an equivalent circuit of the CMOS circuit of FIG. 6A in which reference R designates resistance in each of the fine voltage lines connected to the CMOS components 10. Because the combinations of resistance R vary depending on the physical locations CMOS components 10 or numbers of CMOS components 10 driven at that time, actual amounts of supply voltages to the CMOS components 10 vary by the voltage drops across the resistance R. For example, the voltage V of the source voltage VDD at a specific CMOS component can be V=4.0−2iR or V=4.0−8iR, where i is a current flowing through the fine voltage line.

In the following, it is considered the relationship between the signal propagation delay time in a CMOS circuit 11 and inner current waveforms (power consumption) in the CMOS circuit 11 with reference to FIG. 7. In the example of FIG. 7 and within the context of this specification, the CMOS circuit 11 is a circuit having a large number of CMOS components, such as several ten to a hundred CMOS inverters, buffers or gates or the like, connected in series.

In FIG. 7, a pulse signal P propagates through the CMOS circuit 11 having a large number of CMOS components 10 therein. The pulse signal at an input terminal 3 is designated by an input pulse PI and the pulse signal at an output terminal 4 is designated by an output pulse PO. FIG. 8 is a timing chart showing the waveforms associated with the example of FIG. 7. The input pulse PI shown in FIG. 8A at the input terminal 3 propagates through the CMOS circuit 11 and the output pulse PO comes out at the output terminal 4 after a signal propagation delay time Td of the CMOS circuit 11 as shown in FIG. 8B.

Typically, a signal propagation delay time of each CMOS component is about 10 ps (picosecond), although it varies depending on the supply voltage, the number of stages or temperature. Since the large number of CMOS components, such as several ten to a hundred, are connected in series, an overall propagation delay time between the input terminal 3 and the output terminal 4 of the CMOS circuit 11 may amount to several nanoseconds.

The current waveforms in the CMOS circuit 11 are shown in FIG. 8C. Each of the current waveforms in FIG. 8C is considered with respect to time periods 1, 2 and 3 of FIG. 8D. The current waveform in the time period 1 represents a current i flowing in the CMOS circuit 11 caused by the rising (leading) edge of the pulse signal. The current waveform in the time period 2 represents a current 2i flowing in the CMOS circuit 11 caused by both the rising (leading) edge and the falling (trailing) edge of the pulse signal. The current waveform in the time period 3 represents a current i flowing in the CMOS circuit 11 caused by the falling (trailing) edge of the pulse signal.

As can be seen in FIG. 8C, an overall current flowing in the CMOS circuit, i.e., power consumption therein, depends on whether a pulse signal is applied to the circuit, and the repetition rate (frequency) of the pulse signal. Therefore, the temperature of the CMOS circuit varies depending on the pulse signal supplied thereto and its repetition rate. As noted above, the supply voltages to the CMOS components also vary depending on the voltage drops across the resistance in the fine voltage lines.

In a CMOS circuit, it is known that the delay time Td for a pulse signal P to propagate therethrough is dependent upon the temperature and supply voltages of the CMOS components. The signal propagation delay time Td increases in a manner of second order curve with the increase of the temperature. Further, the signal propagation delay time Td increases in a manner of second order curve with the decrease of the supply voltage. Therefore, a built-in temperature compensation circuit is frequently used in a CMOS circuit which requires high timing resolution and accuracy such as a delay circuit. Typically, such a temperature compensation circuit in a delay circuit includes one or more dummy circuits or heaters.

One of the examples of such temperature compensation circuits is disclosed by an assignee of this invention in Japanese Patent Laid-Open Publication No. 8-330920 "Temperature Balance Circuit", a schematic structure of which is shown in FIG. 9. In the example of FIG. 9, a dummy CMOS circuit 12 is provided in close proximity to the CMOS circuit 11 to be compensated. The dummy CMOS circuit 12 has CMOS components whose number is substantially the same as that of the CMOS circuit 11. Basically, the dummy circuit 12 receives pulse signals in such a manner that an overall number of pulses propagating through both the CMOS circuit 11 and the dummy circuit 12 is constant.

FIG. 10 is a timing chart showing an operation of the temperature compensation circuit of FIG. 9. An input terminal 3 of the CMOS circuit 11 receives a pulse signal PI as shown in FIG. 10A and outputs an pulse PO at an output terminal 4 as shown in FIG. 10C. For a time cycle where the input pulse PI is absent, a pulse signal is provided at an input terminal 3n of the dummy circuit 12 as shown in FIG. 10B which is output at an output terminal 4n as shown in FIG. 10D. Thus, an overall number of pulses propagating through both the CMOS circuit 11 and the dummy circuit 12 is constant.

In other words, the overall number of pulses is set to the maximum, i.e., the highest possible frequency of the input pulse signal. If the number of input pulses to the CMOS circuit 11 is lower than the maximum rate, the difference is supplemented in the dummy CMOS circuit 12. Thus, the sum of currents flowing in the CMOS circuit 11 and the dummy circuit 12 is unchanged at all times as shown in FIG. 8E, resulting in the constant temperature (power consumption) even when the pulse repetition rate of the input pulse signal for the CMOS circuit 11 changes.

To make the overall number of pulses constant, in the conventional example of FIG. 9, a pulse counter and calculation means (not shown) interact to count the number of pulses supplied to the CMOS circuit 11 and to determine a difference between the counted number and the predetermined maximum number. Then the number of dummy pulses which satisfy the difference is input to the dummy CMOS circuit 12, resulting in the total number of pulses which is always equal to the maximum number.

This conventional temperature compensated logic circuit in the above is effective in regulating the temperature of the CMOS logic circuit unchanged without regard to the repetition rate of the pulse signal passing therethrough. However, this example has a disadvantage in that it requires the dummy circuit 12 having a number of components which is comparable to the CMOS logic circuit 11 to be compensated. Thus, an overall circuit size may be about two times as large as the CMOS circuit 11.

Moreover, since the input pulse PI propagating through the CMOS circuit and the pulse signal supplemented in the dummy circuit 12 are asynchronouse with one another, the voltage drops in the supply voltage lines of the CMOS components noted above vary with the types of input pulse signals supplied thereto or combinations of CMOS components receiving the input pulses. This uneven voltage drops in the supply voltages also cause fluctuations in the signal propagation delay time in the CMOS circuit.

SUMMARY OF THE INVENTION

It is, therefore, an object of the present invention to provide a power consumption control circuit for a CMOS circuit which is capable of compensating the difference in the amount of heat dissipation due to the frequency change in a pulse signal passing therethrough and maintaining the temperature of the CMOS circuit constant.

It is another object of the present invention to provide a power consumption control circuit for a CMOS circuit which is capable of compensating the difference in the amount of heat generation caused by frequency changes in a pulse signal passing therethrough with higher accuracy and stability to maintain the same amount of signal propagation delay time in the CMOS circuit.

It is a further objective of the present invention to provide a power consumption control circuit for a CMOS circuit which is capable of compensating the difference in the amount of heat generation caused by frequency changes in a pulse signal propagating therethrough without incorporating voltage variations in supply voltages provided to inner CMOS components.

In the present invention, a leading edge heater and a trailing edge heater are provided in close proximity to the CMOS circuit. During a time period for a leading edge of an input pulse propagates through the CMOS circuit, the leading edge heater is turned off. During a time period for a trailing edge of the input pulse propagates through the CMOS circuit, the trailing edge heater is turned off. As result, an overall current flowing in the CMOS circuit, leading and trailing edge heaters is unchanged regardless of the repetition rate of the input pulse.

According to the present invention, the power consumption control circuit for CMOS circuit for regulating the temperature of the CMOS circuit to be constant for a varying repetition rate of a pulse signal propagating between an input terminal and an output terminal of said CMOS circuit includes a leading edge heater provided in close proximity to the CMOS circuit for generating heat by flowing current i when it is turned on, a trailing edge heater provided in close proximity to the CMOS circuit for generating heat by flowing current i when it is turned on; and a heater control circuit for detecting a leading edge period between a leading edge of an input pulse to the input terminal and a leading edge of an output pulse from the output terminal and turning the leading edge heater off during this leading edge period, and for detecting a trailing edge period between a trailing edge of the input pulse and a trailing edge of the output pulse and turning the trailing edge heater off during this trailing edge period, wherein each of the leading edge and trailing edge of the input pulse causes current i to flow in the CMOS circuit.

BRIEF DESCRIPTION OF THE DRAWINGS

FIG. 4 shows examples of CMOS components in which FIG. 4A is a circuit diagram of an inverter circuit formed by CMOS transistors and FIG. 4B is a circuit diagram of two pairs of CMOS transistors connected in parallel.

FIG. 5A shows a waveform of an input pulse signal propagating through the CMOS circuit and FIG. 5B shows a waveform of current in the CMOS circuit due to the input pulse signal of FIG. 5A.

FIG. 6A shows an example of physical structure in the CMOS circuit on an IC substrate in which arrays of CMOS components and supply voltage lines are illustrated, and FIG. 6B shows an equivalent circuit of FIG. 6A having the CMOS components and supply voltage lines with resistance.

FIG. 14 is a truth table showing associated with the embodiment of FIGS. 12 and 13.

DETAILED DESCRIPTION OF THE PREFERRED EMBODIMENT

Figure 1:
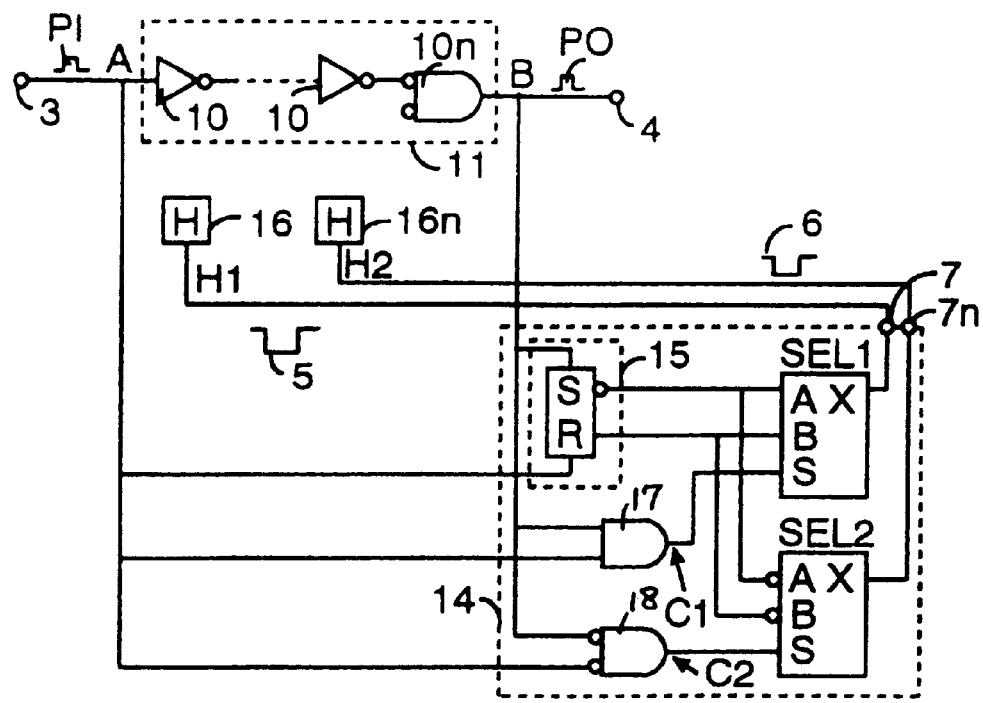
FIG. 1 is a block diagram showing a circuit configuration of the power consumption control circuit for CMOS circuit of the present invention.

Preferred embodiments of the present invention are described with reference to the drawings. FIG. 1 is a block diagram showing a circuit configuration of the power consumption control circuit for a CMOS circuit of the present invention. In the present invention, a leading edge heater and a trailing edge heater are provided in the power consumption control circuit. The sum of the currents flowing in the CMOS circuit to be compensated, the leading edge heater and the trailing edge heater is controlled to be constant all the time.

In FIG. 1, a CMOS circuit 11 is desired to be temperature compensated so that the signal propagation delay time Td is unchanged with the change of the input pulse repetition rate. An example of the CMOS circuit 11 is a high precision delay circuit to be used in a semiconductor test system for generating test signals of various timings. The power consumption control circuit of the present invention includes, in close proximity to the CMOS circuit 11, a leading edge heater 16 and a trailing edge heater 16n, and a heater control circuit 14 to drive the leading edge and trailing edge heaters 16 and 16n. In the example of FIG. 1, the heater control circuit 14 is formed with an SR flip-flop 15, selectors SEL1 and SEL2, AND gates 17 and 18.

The heater control circuit 14 outputs a leading edge interval signal at an output terminal 7 for the leading edge heater 16 and a trailing edge interval signal for the trailing edge heater 16n at an output terminal 7n. The CMOS circuit 11 receives an input pulse PI at an input terminal 3 and outputs an output pulse PO at an output pulse 4. The input pulse PI and output pulse PO are also provided to the SR flip-flop 15 and the AND gates 17 and 18 of the heater control circuit 14 in a manner shown in FIG. 1.

Figure 2A:
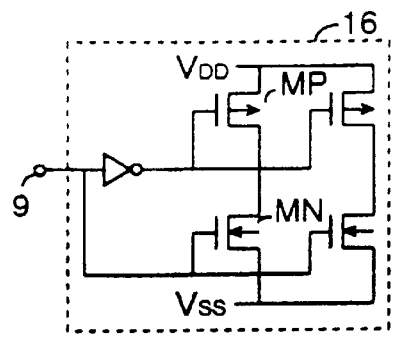
FIGS. 2A and 2B are circuit diagrams showing examples of circuit configuration of the heater used in the power consumption control circuit of FIG. 1.
Figure 2B:
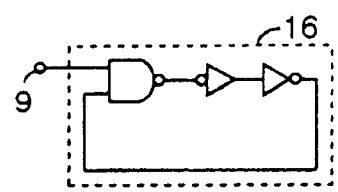

Circuit examples of the heaters 16 and 16n are shown in FIGS. 2A and 2B. The heaters 16 and 16n are preferably formed of CMOS components so that the CMOS circuit 11 and the power consumption control circuit of the present invention can be fabricated in an IC chip. In FIGS. 2A and 2B, the heater 16 flows current therein when the input voltage at a terminal 9 is in a high level (ON state). The heater 16 goes inactive when the input voltage is in a low level (OFF state). When it is in the ON state, the heater 16 is designed to flow current i which is the same amount of the current flow in the CMOS circuit 11 in response to an edge of an input pulse signal.

The heater of FIG. 2A has two complementary CMOS transistors which is basically the same as the CMOS component shown in FIG. 4B. The heater of FIG. 2B functions as an oscillator which oscillates when an input is set to a high level and flows current i, and stops the oscillation when the input is set to a low level. Other circuit types or components of heaters, such as resistors can also be used as the leading and trailing edge heaters of the present invention.

The operation of the power consumption control circuit of FIG. 1 is described with reference to a timing chart of FIG. 3. Assuming there is no input pulse to the CMOS circuit 11, the output terminal 7 of the heater control circuit 14 produces a high level voltage, resulting in the ON state of the leading edge heater 16. Similarly, since there is no output pulse from the CMOS circuit 11, the output terminal 7n of the heater control circuit 14 produces a high level voltage, resulting in the ON state of the trailing edge heater 16n. Thus, in this situation, both of the heaters 16 and 16n are in the ON state to flow predetermined currents therein and thus dissipate heat.

Figure 3A:
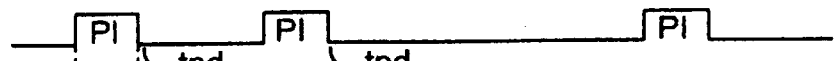
FIGS. 3A–3I are timing charts showing an operation of the power consumption control circuit for CMOS circuit of the present invention shown in FIG. 1.

When an input pulse PI as shown in FIG. 3A is applied to the input terminal 3 of the CMOS circuit 11, the leading edge of the input pulse PI changes the state of the SR flip-flop 15. The voltage change of the flip-flop 15 changes the voltage of the output terminal 7 to the low level through the selector SEL1 as shown in FIG. 3C. Consequently, the leading edge heater 16 goes into the OFF state, thereby dissipating no heat therefrom. Similarly, at the time when the trailing edge of the input pulse PI is input, it changes the voltage of the output terminal 7n to the low level through the selector SEL2 as shown in FIG. 3D. Consequently, the trailing edge heater 16 goes into the OFF state, thereby dissipating no heat.

The input pulse PI propagates through the CMOS circuit 11 with a propagation delay time Td, which results an output pulse PO at the output terminal 4 after Td as shown in FIG.

3B. In this example, the signal propagation delay time Td has a longer time length than the pulse width of the input pulse PI but shorter time length than a time period of the input pulse PI. Thus, during the time when the leading edge of the input pulse PI is still propagating through the CMOS circuit, the trailing edge of the input pulse PI starts propagating in the CMOS circuit 11.

Consequently, as noted above with reference to FIG. 8, there is an overlapping time period in the CMOS circuit 11 during which the currents caused by both the leading edge and the trailing edge of the input pulse PI flow in the CMOS circuit 11. The resultant waveform of the current in the CMOS circuit 11 is shown in FIG. 3F. During the overlapping period, the CMOS circuit 11 consumes electric power which is two times larger than the other active period, i.e., the current 2i.

Figure 3B:
Figure 3C:
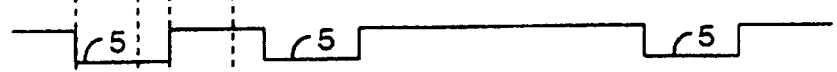
Figure 3D:
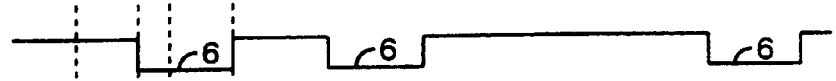
Figure 3E:
Figure 3F:
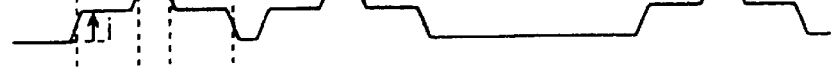
Figure 7:
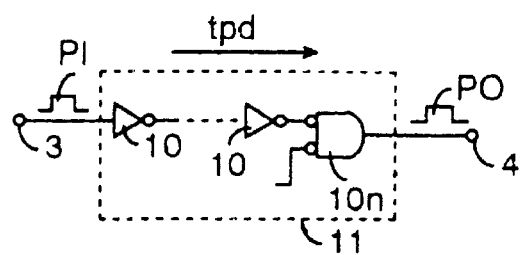
FIG. 7 shows an example of CMOS circuit having a large number of CMOS components thereby producing a certain signal propagation delay time.
Figure 8A:
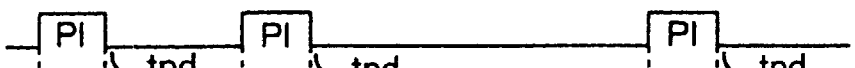
FIGS. 8A–8D are timing charts showing an operation of the CMOS circuit of FIG. 7.
Figure 8B:
Figure 8C:
Figure 8D:
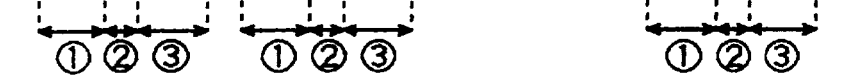

After the propagation delay time Td, the leading edge of the output pulse PO at the output terminal 4 shown in FIG. 3B changes the state of the heater voltage of FIG. 7C to the high level. Similarly, the trailing edge of the output pulse PO changes the state of the heater voltage of FIG. 7D to the high level. Because the heater voltages at the output of the terminals 7 and 7n change in the manner shown in FIGS. 3C and 3D, the leading edge heater 16 and the trailing edge heater 16n are controlled in a manner shown in FIGS. 3G and 3H, respectively.

Figure 3G:
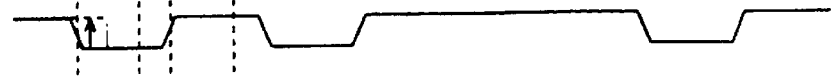
Figure 3H:
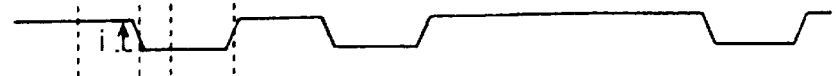
Figure 3I:
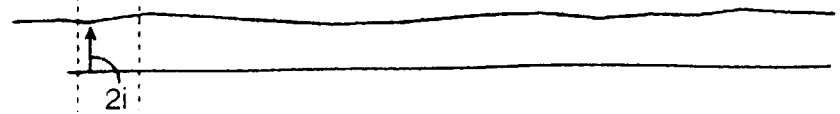

This means that the leading edge heater 16 is controlled to be in the OFF state during the period when the leading edge of the input pulse PI is propagating through the CMOS circuit 11. Similarly, the trailing edge heater 16n is controlled to be in the OFF state during the period when the trailing edge of the input pulse PI is propagating through the CMOS circuit 11. As can be seen in FIGS. 3G and 3H, both of the heaters 16 and 16n are in the OFF state during the overlapping period. FIG. 3I shows an overall current, i.e., power consumption, by both the CMOS circuit 11 and the leading edge and trailing edge heaters 16 and 16n.

As shown in FIG. 3I, according to the present invention, the overall current is substantially the same all the time, the amount of which is 2i, where i is the current flowing in the CMOS circuit 11 for one of the leading or trailing edge of the input pulse. As noted above, each of the heaters 16 and 16n flows the current i when it is in the ON state. In the present invention, as shown in FIG. 3I, the overall current, i.e., the sum of the current flowing in the CMOS circuit 11, the leading edge heater 16 and the trailing edge heater 16n is maintained to be 2i all the time.

Since the heaters 16 and 16n are in close proximity to the CMOS circuit 11, and the overall current (power consumption) is constant, the temperature of the CMOS circuit 11 is also controlled constant. Further, since the current is constant, the supply voltage to the CMOS components is also stabilized. Further, the heater operation is synchronized with the input pulse, causing no voltage fluctuations in the supply voltages to the CMOS components. Thus, the signal propagation delay time Td in the CMOS circuit 11 is unchanged without regard to the changes in the frequency of the input pulse signal.

Figure 11:
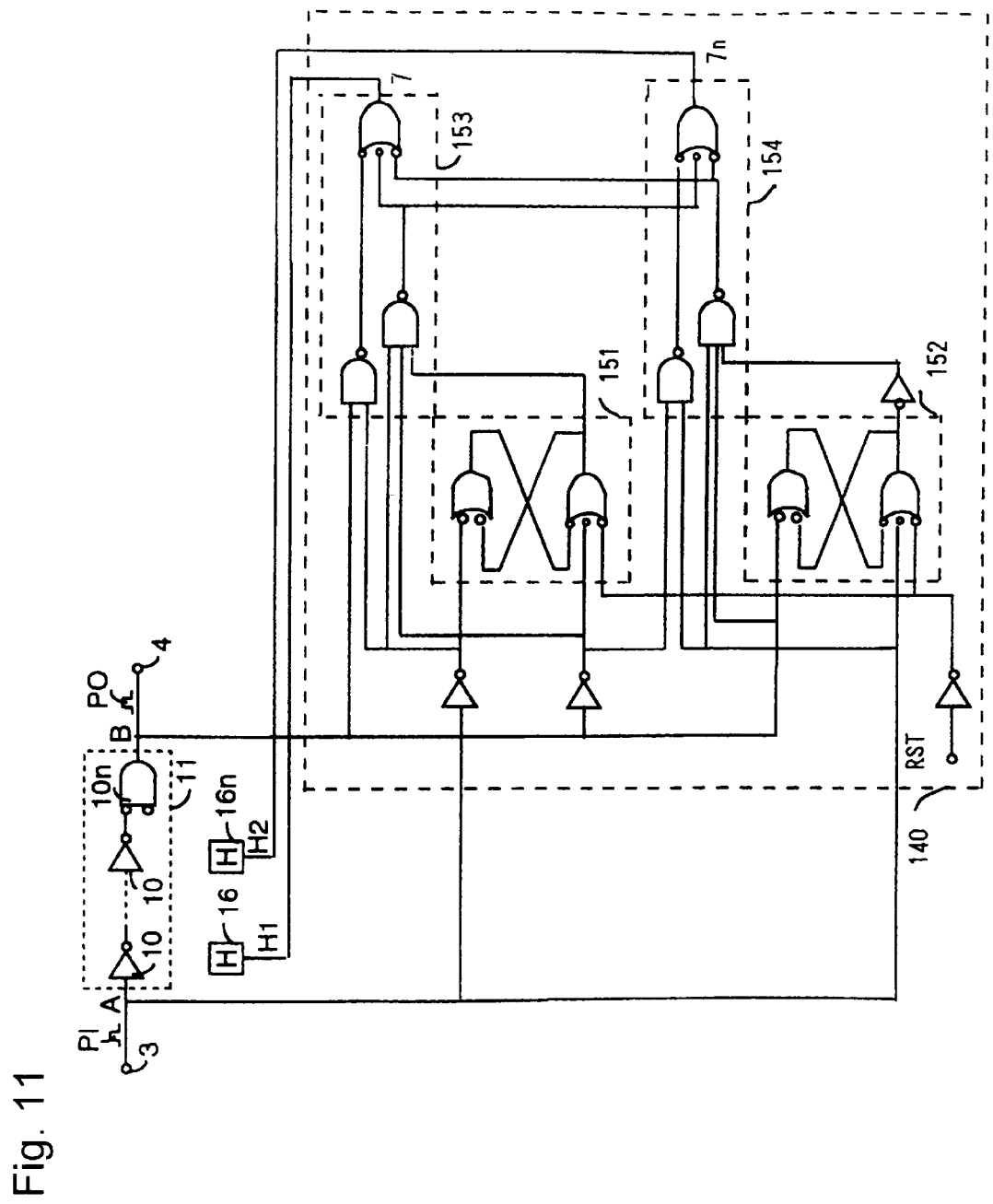
FIG. 11 is a block diagram showing a circuit configuration of another embodiment of the power consumption control circuit of the present invention.

Another embodiment of the present invention is described with reference to FIG. 11. The example of FIG. 11 has a heater control circuit 140 having a different circuit configuration from that of the heater control circuit 14 of FIG. 1. The heater control circuit 140 includes a flip-flop 151, a flip-flop 152 and selector circuits 153 and 154. The flip-flop 151 is to detect the time period required for the leading edge of the input pulse PI to propagate through the CMOS circuit 11. The flip-flop 152 is to detect the time period required for the trailing edge of the input pulse PI to propagate through the CMOS circuit 11.

In operation, by a reset signal to a reset terminal RST, the heater control circuit 140 is set to an initial condition. In the initial condition, if there is no input pulse is input to the CMOS circuit 11, the output terminal 7 of the heater control circuit 140 produces a high level voltage, resulting in the ON state of the leading edge heater 16. Similarly, since there is no output pulse from the CMOS circuit 11, the output terminal 7n of the heater control circuit 140 produces a high level voltage, resulting in the ON state of the trailing edge heater 16n.

Thus, in this situation, both of the heaters 16 and 16n are in the ON state to flow predetermined currents therein and thus dissipate heat. Each of the heaters 16 and 16n is arranged to flow the amount of current i which is equal to the current flowing in the CMOS circuit for each edge of the input pulse signal. Therefore, in the case where the pulse signal is not given to the CMOS circuit 11, an overall current of 2i flows in the heaters 16 and 16n.

When the input pulse PI is applied to the input terminal 3 of the CMOS circuit 11, the rising edge of the input pulse PI changes the state of the SR flip-flop 151. The voltage change of the flip-flop 151 changes the voltage of the output terminal 7 to a low level through the gate circuit 153. Consequently, the leading edge heater 16 goes into the OFF state thereby no current flows therein. Similarly, the trailing edge of the input pulse PI changes the state of the flip-flop 152 which further changes the voltage of the output terminal 7n to the low level through the gate circuit 154. Consequently, the trailing edge heater 16 goes into the OFF state, thereby dissipating no heat.

The input pulse PI propagates through the CMOS circuit 11 with the propagation delay time Td, which results an output pulse PO at the output terminal 4. By the leading edge of the output pulse PO, the flip-flop 151 changes the state, which also changes the heater voltage of the terminal 7 to the high level. Similarly, by the trailing edge of the output pulse PO, the flip-flop 152 changes the state, which also changes the heater voltage of the terminal 7n to the high level. As noted above, in the ON state, each heater 16 flows the amount of current i which is the same as that flowing in the CMOS circuit 11 for one of the leading or trailing edges of the pulse signal.

Thus, the leading edge heater 16 is in the OFF state during the period when the leading edge of the input pulse PI is propagating through the CMOS circuit 11. The trailing edge heater 16n is in the OFF state during the period when the trailing edge of the input pulse PI is propagating through the CMOS circuit 11. Accordingly, an overall current (power consumption), i.e., the sum of the current flowing in the CMOS circuit 11, the leading edge heater 16 and trailing edge heater 16n, is maintained to be constant value 2i.

Since the heaters 16 and 16n are in close proximity to the CMOS circuit 11, and the overall current (power consumption) is constant, the temperature of the CMOS circuit 11 is also controlled constant. Further, since the current is constant, the supply voltage to the CMOS components is also stabilized. Thus, the signal propagation delay time Td in the CMOS circuit 11 is unchanged without regard to the changes in the frequency of the input pulse signal.

Figure 9:
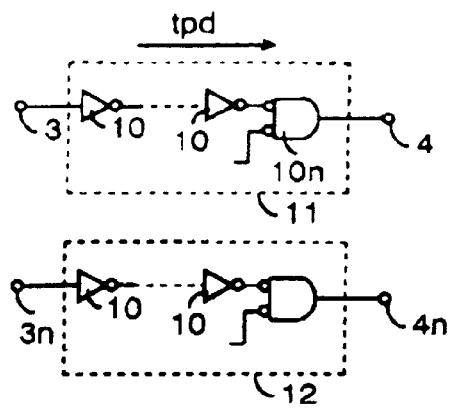
FIG. 9 is a delay circuit in the conventional technology having a CMOS circuit which is temperature compensated by a temperature compensation circuit.
Figure 10A:
FIGS. 10A–10E are timing charts showing an operation of the CMOS circuit and associated temperature compensation circuit of FIG. 9.
Figure 10B:
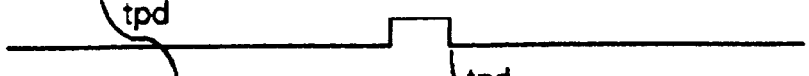
Figure 10C:
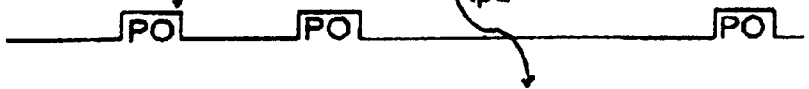
Figure 10D:
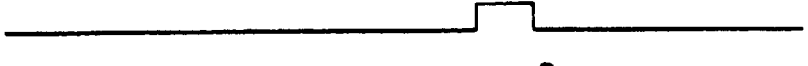
Figure 10E:
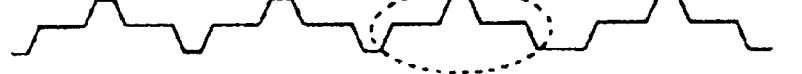

Moreover, each of the leading edge heater 16 and the trailing edge heater 16n can be as small as one CMOS component such as shown in FIG. 2A, resulting in a very small circuit size. This is because the current i flowing in the CMOS circuit 11 is a current flowing in one of the series connected CMOS components for the leading or trailing edge of the input pulse. Further, compensation currents in the heaters 16 and 16n are in a fixed timing relationship, i.e., not asynchronous, with the input pulse propagating through the CMOS circuit 11. Thus, the voltage drops in the supply voltages to the CMOS components are not fluctuated unlike the conventional example of FIGS. 9 and 10.

In the foregoing examples, it is assumed that the signal propagation delay time Td in the CMOS circuit 11 is smaller than a time period of the input pulse. However, in the case where the input pulse frequency is high or the propagation delay time in the CMOS circuit 11 is large, there arises a situation where a time period of the input pulse is shorter than the signal propagation delay time.

Figure 15A:
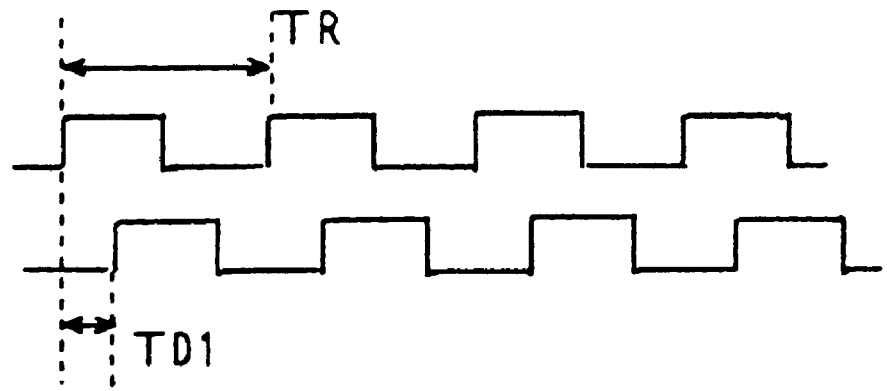
FIG. 15A–15C are timing diagrams showing relationships between pulse intervals of input pulse signals and signal propagation delay times of the CMOS circuits.
Figure 15B:
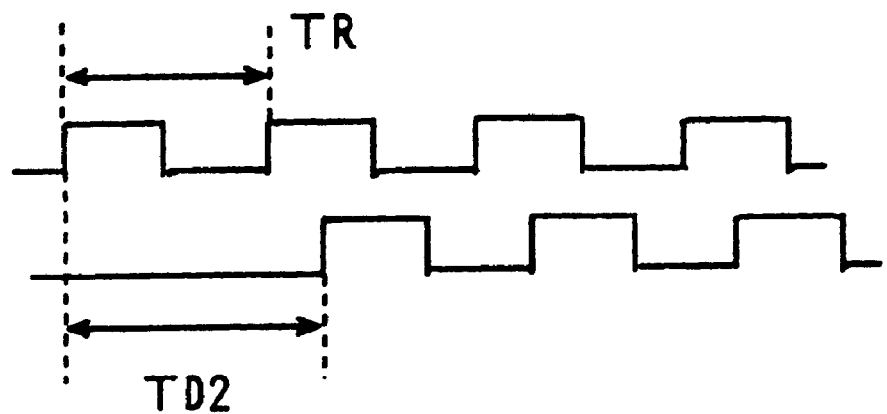
Figure 15C:
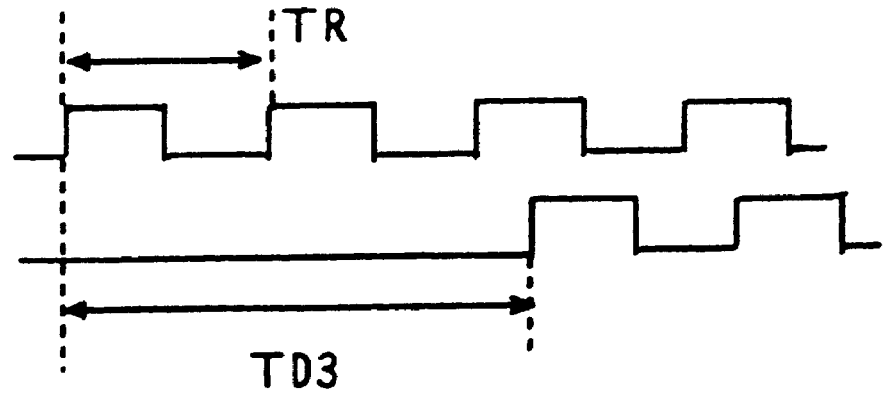

FIGS. 15A–15C show various such situations between a signal propagation delay time of the CMOS circuit to be compensated and a time period of the input pulse provided to the CMOS circuit. The example of FIG. 15A shows the case where a propagation delay time $T_{D1}$ is smaller than a time period TR of the input pulse. The foregoing embodiments of the present invention shown in FIGS. 1 and 11 can fully control the overall power consumption in such a relationship shown in FIG. 15A. However, when signal propagation delay times $T_{D2}$ or $T_{D3}$ are larger than the time period TR of the input pulse such as shown in FIGS. 15B or 15C, the foregoing embodiments are not sufficient to maintain the constant overall current or power consumption.

Figure 12:
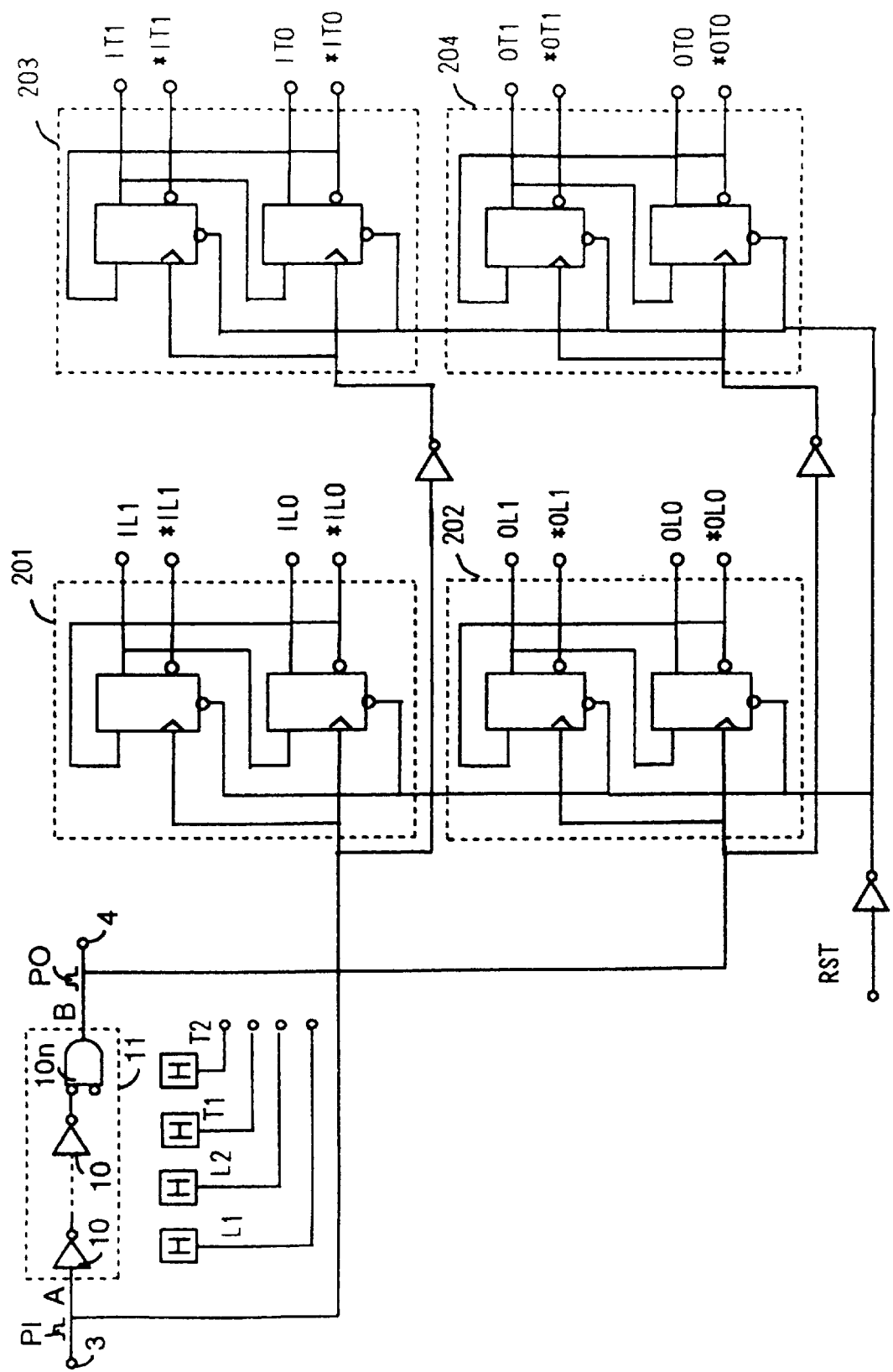
FIG. 12 is a block diagram showing a circuit configuration of a further embodiment of the power consumption control circuit of the present invention.
Figure 13:
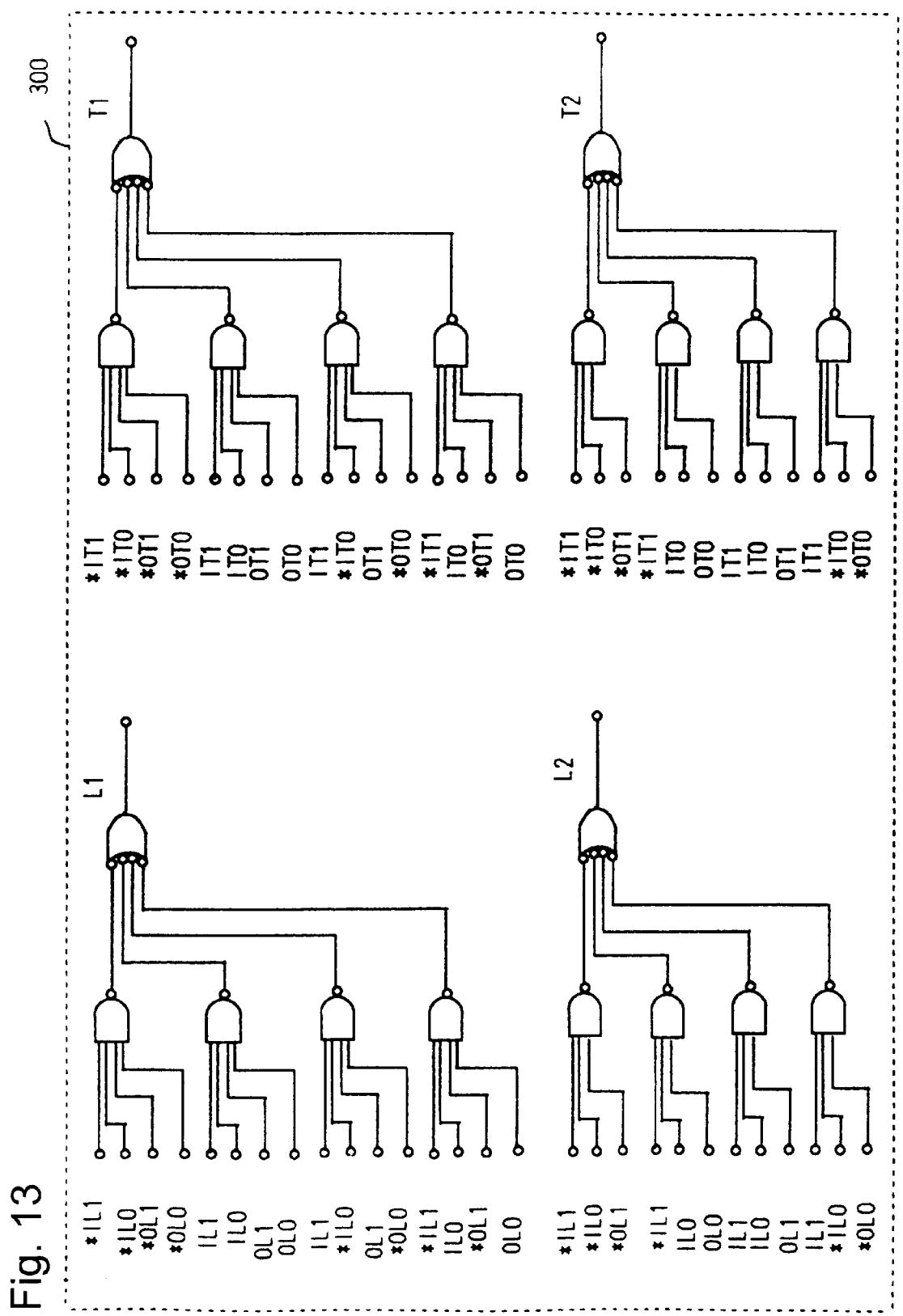
FIG. 13 is a circuit diagram showing a circuit diagram of the embodiment of FIG. 12.

FIGS. 12–14 show a further embodiment of the present invention in which an overall current is controlled to be constant when the signal propagation delay time of the CMOS circuit is longer than the time period of the input pulse such as shown in FIGS. 15B and 15C. The example of FIGS. 12–14 is designed to maintain the constant power consumption when the signal propagation delay time Td longer than two time periods (but shorter than three time periods) of the input pulse signal. This timing relationship is shown in FIG. 15C wherein three leading edges of the input pulse propagate in the CMOS circuit.

In the situation of FIG. 15C, the current in the CMOS circuit 11 can be four kinds; zero, i, 2i and 3i. FIGS. 12 and 13 show an example of circuit configuration for maintaining the fixed current 3i in the sum of currents flowing in the CMOS circuit 11 and heaters L1, L2, T1 and T2. In FIG. 12, leading edge heaters L1 and L2 and trailing edge heaters T1 and T2 are provided in close proximity to the CMOS circuit 11 whose propagation delay time Td is to be compensated. Each of the leading edge heaters L1 and L2 and trailing edge heaters T1 and T2 is designed to flow current i which is the same amount of current flowing in the CMOS circuit 11 corresponding to one of the edges of the input pulse. The input and output terminals of the CMOS circuit 11 are also connected to counters 201–204. The output of the counters 201–204 are provided to a gate circuit 300 of FIG. 13 which provides heater drive voltages at terminals L1, L2, T1 and T2.

In the example of FIG. 12, the counter 201 is a 2-bit counter which counts the number of leading edges of the input pulse PI applied to the CMOS circuit 11. The counter 202 is a 2-bit counter which counts the number of leading edges of the output pulse PO derived from the CMOS circuit 11. The counter 203 is a 2-bit counter which counts the number of trailing edges of the input pulse PI applied to the CMOS circuit 11. The counter 204 is a 2-bit counter which counts the number of trailing edges of the output pulse PO derived from the CMOS circuit 11.

Based on the count values in the counters 201–204, appropriate heaters are selected and set to the OFF states. For example, by the difference between the number of leading edges in the input pulse PI and the output pulse PO, the number of leading edges still propagating in the CMOS circuit 11 is known. Similarly, by the difference between the number of trailing edges in the input pulse PI and the output pulse PO, the number of trailing edges still propagating in the CMOS circuit 11 is known. Depending on the number of edges propagating in the CMOS circuit 11 counted in this manner, the corresponding heaters are selected and turned off by the output voltages of the gate circuit 300.

FIG. 14 is a truth table showing the count values and the on/off control logic for the leading and trailing edge heaters L1, L2, T1 and T2. The gate circuit 300 of FIG. 13 is to actualize the logic in the truth table of FIG. 14 by the hardware circuit. In the truth table of FIG. 14, "VD IN" designates the counted number of leading edges at the input terminal 3, and "VD OUT" designates the counted number of leading edges at the output terminal 4. "CNT" designates differences in the counted number, and "Heater Control" designates on/off control logic for the leading and trailing edge heaters L1, L2, T1 and T2.

In the above example of FIGS. 12–14, the current in each of the heaters L1, L2, T1 and T2 is set to i, however, a different amount of current can be also set in the heaters. Although four heaters are included in the example of FIG. 12, the number of heaters can be reduced depending on the actual situation of input signal and the CMOS circuit. For example, if the overlapping period when the overall current 3i flows in the CMOS circuit is very short, only two heaters may be practically sufficient to maintain the overall current 2i rather than 3i.

According to the present invention, since the leading and trailing edge heaters are arranged in close proximity to the CMOS circuit, and the overall current (power consumption) is constant, the temperature of the CMOS circuit is also controlled to be constant. Further, since the current is constant, the supply voltage to the CMOS components is also stabilized. Thus, the signal propagation delay time Td in the CMOS circuit 11 is unchanged without regard to the changes in the frequency of the input pulse signal.

Moreover, there is no substantial increase in the circuit size since each of the leading and trailing edge heaters is very small. Further, compensation currents in the leading and trailing edge heaters are in a fixed timing relationship with the input pulse propagating through the CMOS circuit 11. Thus, the voltage drops in the supply voltages to the CMOS components are not fluctuated by the current flowing in the heaters.

What is claimed is:

1. A power consumption control circuit for CMOS circuit for regulating temperature of the CMOS circuit to be constant for a varying repetition rate of a pulse signal propagating between an input terminal and an output terminal of said CMOS circuit, comprising:

a leading edge heater provided in close proximity to said CMOS circuit for generating heat by flowing current i when it is turned on;

a trailing edge heater provided in close proximity to said CMOS circuit for generating heat by flowing said current i when it is turned on; and a heater control circuit for detecting a leading edge period between a leading edge of an input pulse to said input terminal and a leading edge of an output pulse from said output terminal and turning said leading edge heater off during this leading edge period, and for detecting a trailing edge period between a trailing edge of said input pulse to said input terminal and a trailing edge of said output pulse from said output terminal and turning said trailing edge heater off during this trailing edge period;

wherein each of said leading edge and trailing edge of said input pulse causes said current i to flow in said CMOS circuit.

2. A power consumption control circuit for CMOS circuit as defined in claim 1, wherein said heater control circuit comprising a flip-flop circuit which produces a signal for making said leading edge heater inactive during a time period when said leading edge of said input pulse is propagating through said CMOS circuit, and a logic circuit which produces a signal for making said trailing edge heater inactive during a time period when said trailing edge of said input pulse is propagating through said CMOS circuit.

3. A power consumption control circuit for CMOS circuit as defined in claim 1, wherein said leading edge heater and said trailing edge heater are comprised of CMOS transistors.

4. A power consumption control circuit for CMOS circuit as defined in claim 1, wherein said heater control circuit comprising:

a first flip-flop for detecting said leading edge period between the leading edge of said input pulse to said input terminal and the leading edge of said output pulse from said output terminal;

a first gate circuit connected to said first flip-flop for transmitting a first heater drive signal to make said leading edge heater inactive during said leading edge period;

a second flip-flop for detecting said trailing edge period between the trailing edge of said input pulse to said input terminal and the trailing edge of said output pulse from said output terminal; and a second gate circuit connected to said second flip-flop for transmitting a second heater drive signal to make said trailing edge heater inactive during said trailing edge period.

5. A power consumption control circuit for CMOS circuit for regulating temperature of the CMOS circuit to be constant for a varying repetition rate of a pulse signal propagating between an input terminal and an output terminal of said CMOS circuit, comprising:

a plurality of leading edge heaters provided in close proximity to said CMOS circuit, each of said leading edge heaters generating heat by flowing current i when it is turned on;

a plurality of trailing edge heaters provided in close proximity to said CMOS circuit, each of said trailing edge heaters generating heat by flowing said current i when it is turned on; and a first counter for counting the number of leading edges of an input pulse applied to said input terminal of said CMOS circuit;

a second counter for counting the number of leading edges of an output pulse derived from said output terminal of said CMOS circuit;

a third counter for counting the number of trailing edges of said input pulse applied to said CMOS circuit;

a fourth counter for counting the number of trailing edges of said output pulse derived from said CMOS circuit;

a gate circuit for selectively driving said plurality of leading edge heaters based on a difference of counted values between said first counter and said second counter, and for selectively driving said plurality of trailing edge heaters based on a difference of counted values between said third counter and said fourth counter;

wherein each of said leading edge and trailing edge of said input pulse causes said current i to flow in said CMOS circuit.

6. A power consumption control circuit for CMOS circuit as defined in claim 1, wherein each of said plurality of leading edge heaters and said plurality of trailing edge heaters are comprised of CMOS transistors.

* * * * *